United States Patent [19]
Hong et al.

[11] Patent Number: 5,842,156
[45] Date of Patent: Nov. 24, 1998

[54] MULTIRATE MULTIRESOLUTION TARGET TRACKING

[75] Inventors: Lang Hong, Beavercreek; Michael W. Logan, Huber Heights, both of Ohio

[73] Assignee: The United States of America as represented by the Secretary of the Air Force, Washington, D.C.

[21] Appl. No.: 746,508

[22] Filed: Nov. 12, 1996

[51] Int. Cl.[6] ................................................. G01S 13/00
[52] U.S. Cl. .......................... 702/179; 342/104; 342/118; 342/145; 342/147; 342/159
[58] Field of Search ..................................... 364/572, 574, 364/581; 342/59, 90, 95, 96, 104, 108, 118, 145, 146, 147, 159, 160, 189, 350, 378, 450, 465; 382/103; 701/23, 200, 301; 702/179, 181, 189, 190, 191

[56] References Cited

U.S. PATENT DOCUMENTS

| | | | |
|---|---|---|---|
| 5,128,684 | 7/1992 | Brown | 342/189 |
| 5,138,321 | 8/1992 | Hammer | 342/36 |
| 5,202,691 | 4/1993 | Hicks | 342/90 |
| 5,210,798 | 5/1993 | Ekchian | 382/14 |
| 5,214,433 | 5/1993 | Alouani et al. | 342/95 |
| 5,325,098 | 6/1994 | Blair et al. | 342/95 |
| 5,341,142 | 8/1994 | Reis et al. | 342/64 |
| 5,396,252 | 3/1995 | Kelly | 342/94 |
| 5,406,289 | 4/1995 | Barker | 342/96 |
| 5,414,643 | 5/1995 | Blackman et al. | 364/516 |
| 5,491,645 | 2/1996 | Kennedy et al. | 364/516 |
| 5,537,119 | 7/1996 | Poore, Jr. | 342/96 |
| 5,602,760 | 2/1997 | Chacon et al. | 364/516 |
| 5,657,251 | 8/1997 | Fiala | 342/162 |

OTHER PUBLICATIONS

Hong et al., "Multirate Interacting Multiple Model Filtering for Target Tracking", Proceedings of the SPIE, vol. 2561, pp. 275–286, Jul. 11, 1995.

Hong et al., "A Multiresolutional Approach to Target Tracking", IEEE Aerospace and Electronics Conference, pp. 388–392, May 24, 1993.

Hong et al., "Real–time Optimal Multiresolutional Sensor/Data Fusion", IEEE Robotics and Automation, International Conference, pp. 117–122, Sep. 1993.

Hong, "Recursive Algorithms for Information Fusion Using Belief Functions with Applications to Target Identification", IEEE Control Applications, pp. 1052–1057, Jul. 1992.

Hong, "Optimal Multiresolutional Distributed Filtering", IEEE Decision and Control Conference, pp. 3105–3110, Feb. 1992.

*Primary Examiner*—John Barlow
*Assistant Examiner*—Patrick Assouad
*Attorney, Agent, or Firm*—Gina S. Tollefson; Gerald B. Hollins; Thomas L. Kundert

[57] ABSTRACT

A multiresolution, multirate approach for detecting and following targets. The resolution of data obtained from a target scanning region is reduced spatially and temporally in order to provide to a tracker a reduced amount of data to calculate. Balances of computer processing resources with long-range detection and multiple target tracking are provided. Computer processing resources can be allocated to other systems while still maintaining an accurate tracking function and alternatively, the tracking function can receive a high level of computer processing resources and track at a finer resolution. An ability to recover raw data points from the spatially and temporally reduced values is also provided.

17 Claims, 7 Drawing Sheets

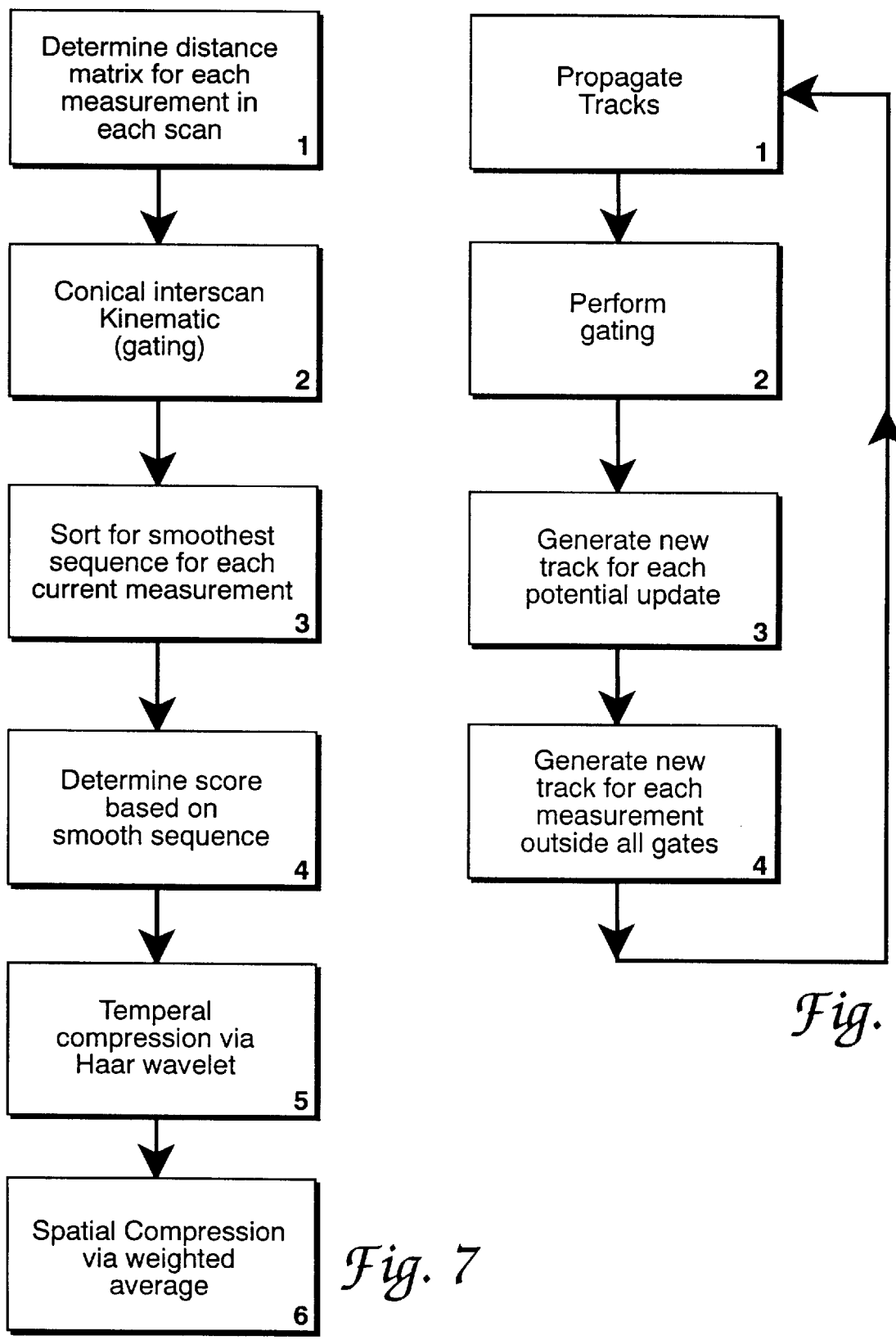

MULTIRATE MULTIRESOLUTION TARGET TRACKING

RIGHTS OF THE GOVERNMENT

The invention described herein may be manufactured and used by or for the Government of the United States for all governmental purposes without the payment of any royalty.

MICROFICHE APPENDIX

This document includes a non-printed computer program listing which is disclosed in the form of a microfiche appendix as provided for in 37 CFR 1.96(b) and MPEP section 608.05. This appendix consists of 26 pages or frames located on a total of 1 microfiche.

BACKGROUND OF THE INVENTION

This invention relates to the field of target tracking and more generally to processing of data to reduce the number of calculations processed by any given tracker.

Tracking is the processing of sensor measurements obtained from a target in order to maintain an estimate of its current state, which typically consists of kinematic components (position, velocity, acceleration), other components (radiated signal strength, spectral characteristic) and constant or slowly varying parameters (coupling coefficients, propagation velocity). Measurements are noise-corrupted observations related to the state of a target, such as position, range or azimuth from a sensor, time of arrival difference between two sensors and frequency of signal. Based on these two definitions, "target tracking" can be understood as the process of estimating the states of a target from noisy measurements collected by sensory devices. The measurements of interest in multi-target applications are usually not raw data points, but rather the outputs of signal processing and detection subsystems.

Target tracking is straightforward if there is only a single, nonmaneuvering target generating measurements at regular time intervals. However, with high performance combat requirements such as multiple targets, false detections, missed detections, and maneuvering targets added to the scenario and with the high bandwidth and sensitivity of modern sensors, the numerical difficulties and computational power requirements quickly explode. Moreover, the tracking effort for targets can be substantially more costly than n times the effort for a single target. In the airborne tracking scenario, there is often limited computer processing resources available due to space, weight and power supply limits, limited data communication capability between aircraft, and limited pilot capability.

Most airborne target tracking systems therefore make simplifying tracking assumptions in order to obtain real-time system performance, and these assumptions place practical limitations on the sensitivity of modern systems. One common assumption is to greatly reduce the likelihood of false alarms by declaring as "detections" only signals with large signal to noise ratios. In this case, there is little doubt as to the origin of the strong signal and these detections can be displayed directly to the pilot. This case is illustrated in FIG. 1. The signal represented in the figure has many peaks, only two of which are due to actual targets. One of the targets is very strong, and can easily be distinguished from the surrounding noise peaks. The signal due to the second target, the dim target, however, is on the same order of magnitude as the surrounding noise peaks. By setting the detection threshold high enough to eliminate all false alarms, only the stronger target is detected, as illustrated by Detection Threshold 1 in FIG. 1. To detect the weaker target the detection threshold must be lowered, as shown by Detection Threshold 2. This lower threshold results in five false alarms and so a tracking algorithm is necessary to identify the true target measurements based on established track histories. It is a fundamental aspect of signal processing that the lower the threshold is set, and the dimmer the desired target, the more computationally complex the problem becomes. In other words, the practical limit on the ability of a system to detect and track dim targets is directly related to the computational power available to the tracking system.

The problem of high demand on computer processing resources in tracking systems is well known and has been addressed in various ways. For example, enhanced gating of the raw data reduces the number of data points to be computed by the tracker. Increased gating, however, also reduces the ability to track dim targets. Standard estimation algorithms have also been applied to reduce calculations within the tracker, where the measurements used to update each track is that measurement nearest in some sense to the predicted measurement. This approach, referred to as a nearest neighbor filter, can lead to very poor results where spurious measurements occur frequently. This is because such an algorithm does not account for the fact that the measurement used in the filter might have originated from a source other than the target of interest. All known approaches to reduce computational requirements are single resolution, time-consuming and inhibit the ability of the system to track dim, maneuvering targets.

SUMMARY OF THE INVENTION

The approaches discussed above addressing the issue of limited computer processing resources are all single rate and single resolution. In contrast, the present invention addresses the issue of limited computer processing resources by providing a full tracking system computer processing load reduction approach using multiresolution and multirate techniques. Further, the present invention is not tracker specific, and could be used to reduce the data, and in turn the computational load, input to any known tracker and thereby enhance performance and allow it to track even more distant targets. The processing overhead allotted to the present invention can be varied in real-time to dynamically allocate system resources based on the relative importance of the tracking function in comparison with other computational needs. This is a critical feature in implementing high performance tracking algorithms in aerospace systems which have severe size, weight, and cooling restrictions associated with computer apparatus.

It is an object of the present invention to provide both spatial and temporal reduction of target sensor measurements to reduce computational requirements while maintaining a high degree of accuracy in tracking output.

It is an advantage of the present invention to increase aircraft survivability by tracking dim targets and extending detection range to allow missile launch from a safe distance.

It is another advantage of the present invention to extend the range and reliability of target detection by effectively rejecting false alarms.

It is another advantage of the present invention to allow real-time adjustment of computational requirements based on the resources available for the tracking function.

It is another feature of the present invention to provide a target tracker that filters sensor measurements to a coarse resolution with the option of selective recovery of the fine resolution measurements which combine to form the coarse resolution measurement.

These and other objects of the present invention are achieved by a data reducing method for detecting and following targets comprising the steps of:

collecting raw data of fine resolution representative of target position, velocity and acceleration characteristics determined from a sequential plurality of target region scans by a group of target data sensors of differing target signature sensing capability;

scoring each of n number of sequences of fine resolution raw target data according to predefined kinematics patterns, said scoring reflecting a temporal reduction of raw data points into a single point representing weights of the raw data points making up each of said sequences;

combining a selected number of scores from each of n number of sequences, said combining reflecting a spatial reduction of scored fine resolution points into a single coarse resolution point;

tracking said coarse resolution measurements; and providing tracking information output signals.

Additional objects and features of the invention will be understood from the following description and claims and the accompanying drawings.

BRIEF DESCRIPTION OF THE DRAWINGS

FIG. 7 is a flow chart of the process for temporally and spatially reducing data.

FIG. 8 is a flow chart of a data reduction portion of the accompanying computer software.

DETAILED DESCRIPTION

The present invention is a method of reducing demand on computer processing resources by reducing the number of computations performed by a tracker. The present invention enhances the performance of and may be employed with any commercially available tracker. Current tracking algorithms process all measurements generated by the sensors to predict the location of a target. Processing all measurements is very computationally intensive especially when many false alarms are present and often decreases the accuracy of a target prediction. As will be understood from the following discussion, the present invention, in contrast, compiles multiple numbers of system sensor measurements into a single representative measurement for computer processing resource purposes and does so while maintaining the accuracy of the original single measurements.

Figure 2:
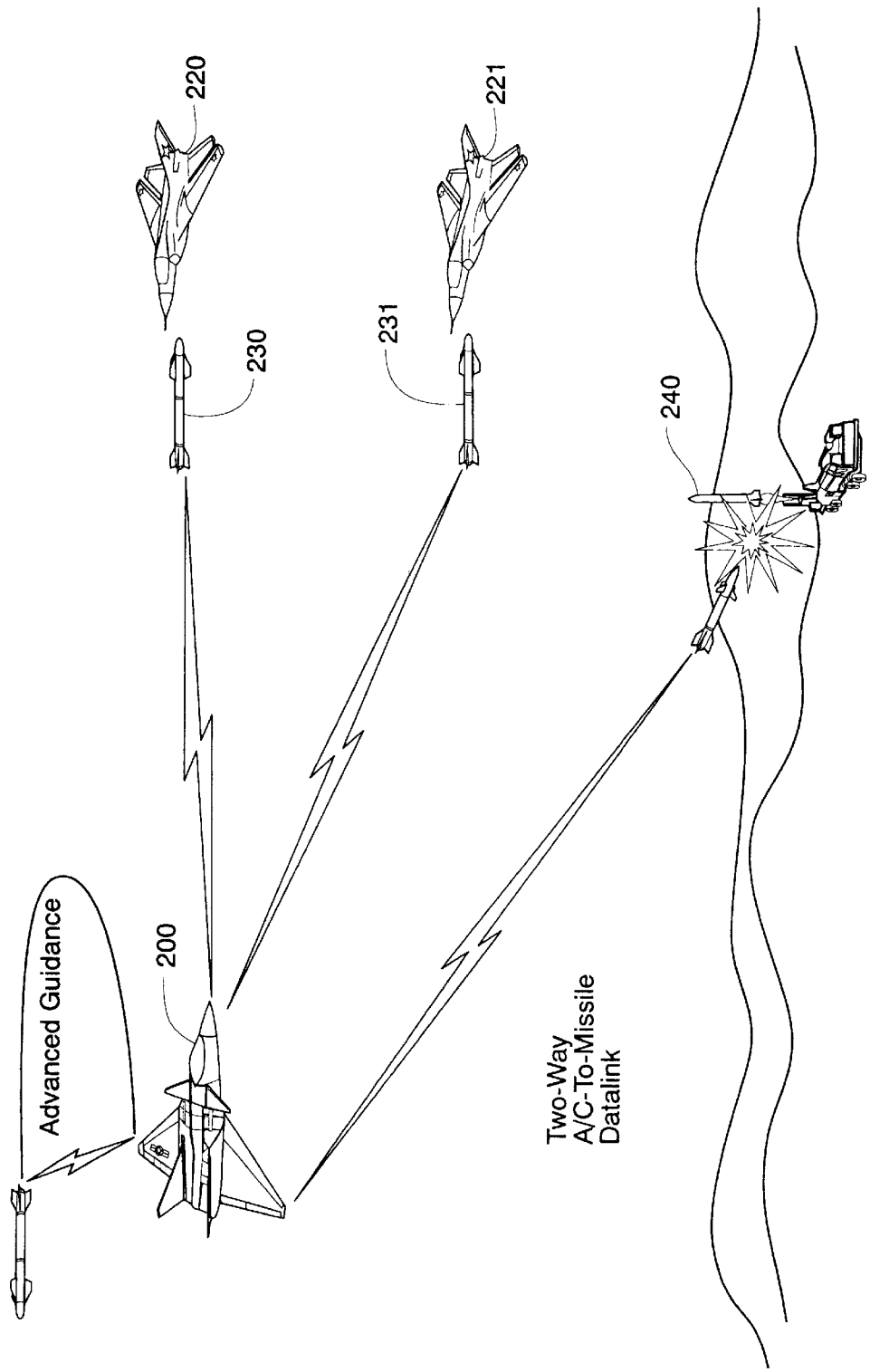
FIG. 2 shows a combat scenario employing multiresolution multirate tracking.

FIG. 2 is a dramatization of multiresolution/multirate target tracking (MMTT) used in a combat scenario. The MMTT system onboard aircraft 200 is used to provide accurate tracking of dim maneuvering enemy aircraft 220 and 221, despite their dim radar signature such that aircraft 200 can ultimately deploy missiles 230 and 231 against enemy aircraft 220 and 221 at a safe distance. Accurate and efficient tracking of ground launched missiles 240 is also represented.

Figure 1:
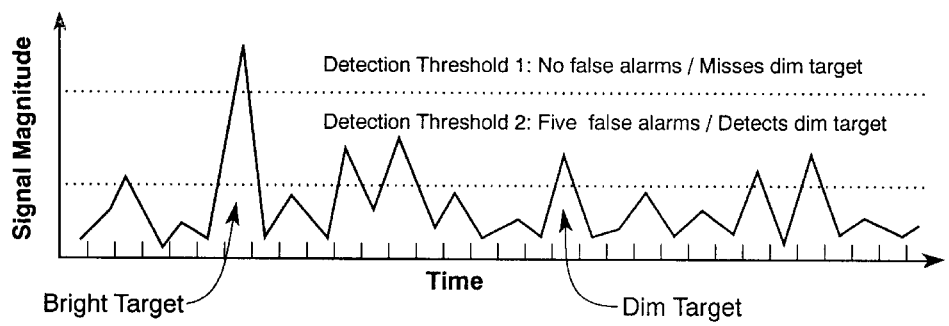
FIG. 1 is a graph showing different prior art tracking scenarios.
Figure 10:
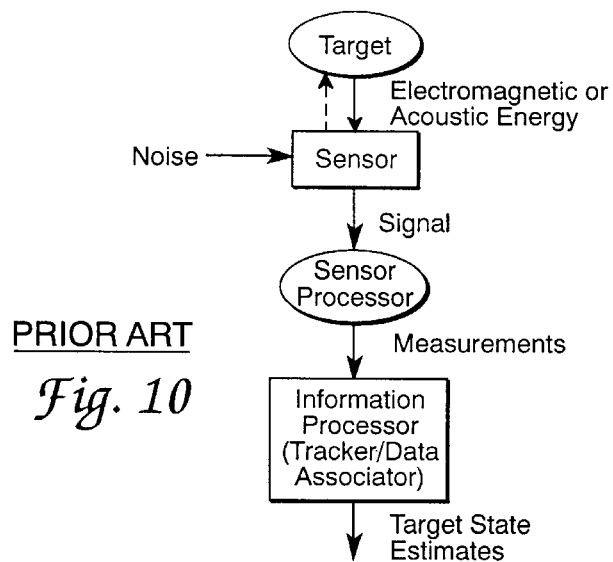
FIG. 10 is a block diagram of a typical prior art tracking system.

Components of a typical tracking system are illustrated in block form in FIG. 10. The present invention is best considered as an improved component of such a known tracking system, a tracking system as shown in block form in FIG. 3, for example. The functions represented in the block diagram are described below.

As is known in the field of tracking, a predetermined spatial region is continually scanned by system sensors which provide data relative to any given target's position, velocity and angular displacement in the region and the information is converted to kinematic equations. Such a kinematic equation may have the matrix expression $$x_{k+1}=A_k x_k + w_k; \quad w_k \sim N(O, Q_k) \qquad Eq.\ 1$$

where $x_k$ is a vector containing quantities of interest such as a target's position, velocity and acceleration. Kinematic behavior in Eq. 1 is described by the term $A_k$ and $w_k$ reflects a degree of the kinematic uncertainty arising from the fact that the model is less than perfect. The following equation can be used to predict the incoming measurements generated by a target in a known state:

$$z_k = C_k x_k + v_k; \quad v_k \sim N(O, R_k) \qquad Eq.\ 2$$

where $z_k$ are measurements and $v_k$ (sensor uncertainty index) captures the sensor uncertainty. These two equations are fundamental to any tracking system. By iteratively assuming a target state and predicting the position of the next measurement, and comparing the estimated measurements with the actual measurements at the next scan, very accurate state measurements can be generated for actual targets.

Figure 3:
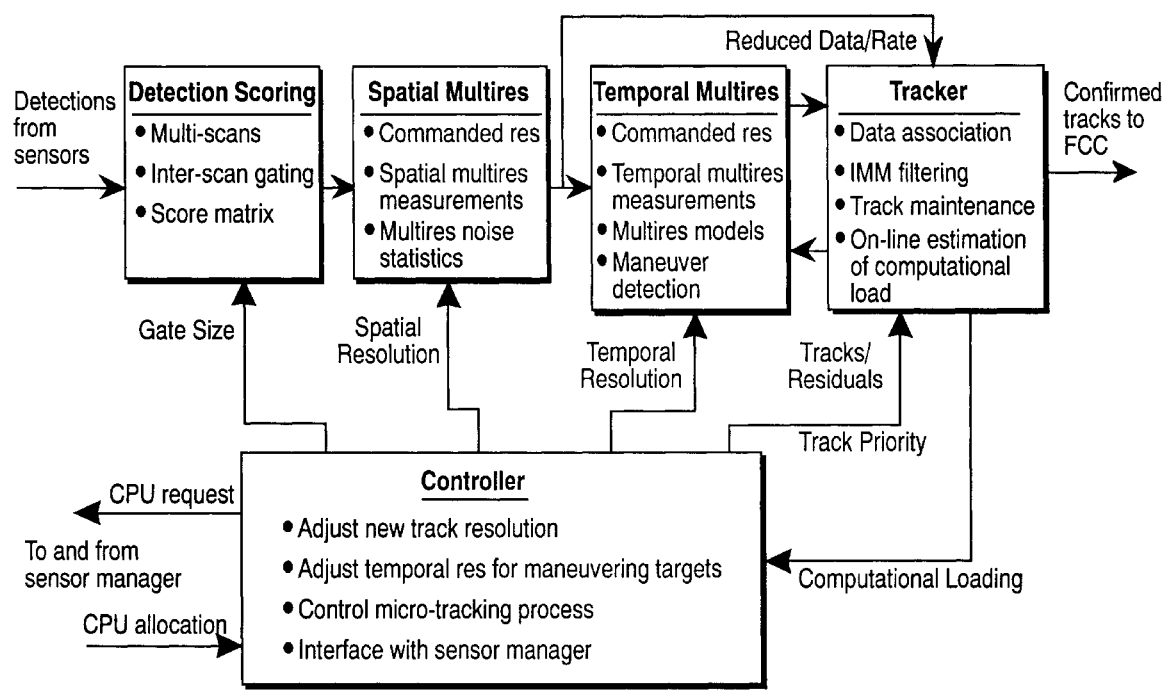
FIG. 3 is a block diagram of a tracking system employing multiresolution multirate tracking.

This conventional tracking approach is represented by the Tracker block of FIG. 3. Another separate controlling component of the tracker generally controls track parameters and this is represented by the Controller block of FIG. 3. The other blocks represent the innovative feature of the invention. Software is included in the present disclosure which simulates the present invention and flow charts of the same are provided in FIGS. 7, 8 and 9. The flow charts of FIGS. 8 and 9 include the steps of initializing tracks and generating a prediction of next target position. In the following description, assume an initial scan and sensing of target data is provided to the tracker which initializes tracks and generates a prediction of next target position.

After the data from the initial scan is processed through the tracker, the sensed data from subsequent scans, hereinafter referred to as raw data or fine resolution data, is subject to gating. Gating is a measurement sifting procedure which eliminates measurements which are highly unlikely to have originated from targets based on the available information. To gate data, a normalized distance for each raw data point is determined by dividing the distance between the raw data measurement and the point predicted as the next measurement by a calculated uncertainty factor. All raw data that is greater than a preselected distance from the predicted next target position is eliminated from further consideration. The gating on a 2-dimensional space with a preselected threshold is equivalent to placing an ellipse on the 2-dimensional space with the center of the ellipse located at the predicted measurement, and accepting only those measurements which fall into the ellipse as the potential measurements for further processing.

The uncertainty factor used in calculating the normalized distance is determined by the quality of the previous track and the uncertainty index associated with the sensors. For example, in the case of a microwave radar based tracking system, the measure of distance is relatively accurate, and as a result, a low value of uncertainty index is used. In the case of an infrared or IR based measurement, the angular measurement is more accurate than the distance measurement and an uncertainty index for the angular measurements is larger than that of the distance measurement. The computations involving gating and uncertainty are preferably accomplished in software form in the present invention. The computer code listing portion identified as tcon1.m in the microfiche appendix performs these computations. The type of sensors used with the FIG. 3 system may be any type known in the art or commercially available—with the understanding that the uncertainty index associated with the particular sensors employed is used in gating the information from the detected target.

Figure 4:
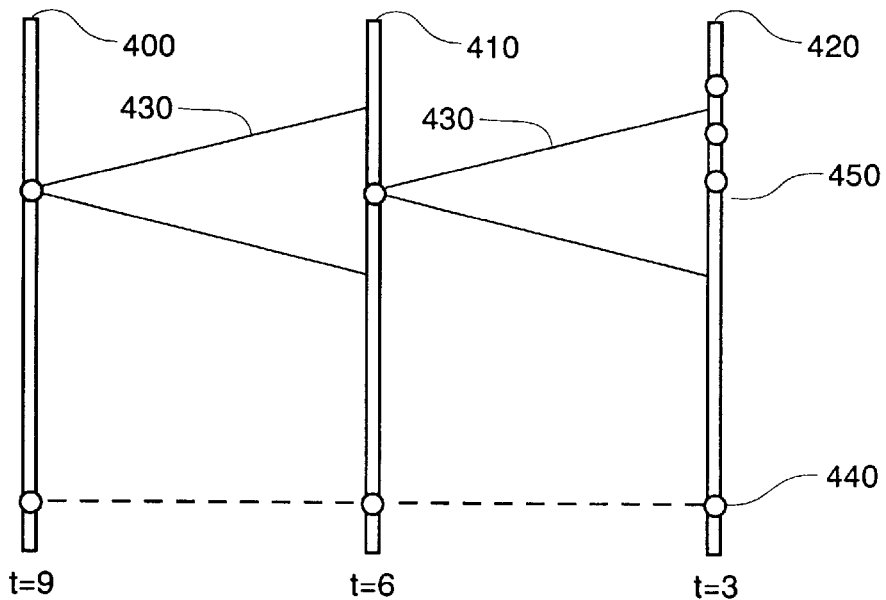
FIG. 4 shows a representation of conical interscan kinematic gating.

The gated data obtained from repeated scans of a predetermined region are considered for a time or space correlation suggesting a sequence of measurements representing a target. This is represented in the Detection Scoring block of FIG. 3. FIG. 4 of the drawings represents the process of propagating backward in time to look at measurements in previous scans that are possible tracking sequences of interest by using a conical shaped gating process. The positions of the current measurements at scan 400 are compared with measurements from the previous two scans, 410 and 420. Patterns of kinematic smoothness are identified. For example, a measurement from scan 400 would look for measurements in scans 410 and 420 that would comprise a measurement sequence best fitting a predefined kinematic pattern (with "ideal" smoothness defined as 3 points on a straight line). The degree of likeness is described by a score function and each measurement in scan 400 is assigned a score which reflects a best sequence fit ending at that measurement, the score being a temporal reduction of the data. The number of previous scans that any given current measurement utilizes in detection scoring is at least three, but further depends upon the frequency with which the system operator desires target track updates. The step of propagating backward in time is performed in the accompanying software by the program routine titled coarse.m.

Figure 5:
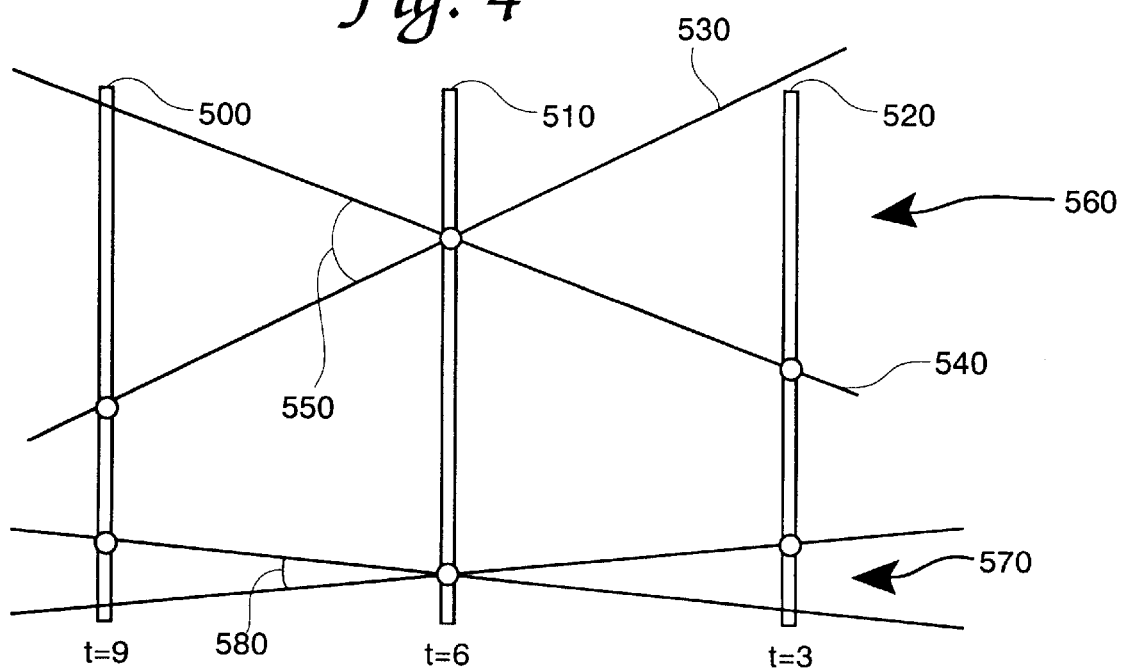
FIG. 5 shows a representation of scoring.

Temporal reduction is shown in FIG. 5, where the predefined pattern sequence is a smooth sequence. This occurs in the Temporal Multires block of FIG. 3 and is the first resolution reduction of the present invention. The flow graph of the software simulating this reduction appears in FIG. 7, blocks 3, 4 and 5 and is accomplished by the program routines titled coarse.m and tcon1.m in the microfiche appendix. This resolution reduction provides partial control of the computational load of the tracker by temporally reducing raw data to a coarser resolution. The raw data measurement sequences are formatted as an optimization problem to assign the maximum possible score. For example, the scoring mechanism used in the accompanying computer program can be expressed as $$\theta_i^k = \min_{1 \leq m_{k-1}, 1 \leq 1 \leq m_{k-2}} \theta_{jl} \qquad \text{Eq. 3}$$

$$= \min_{1 \leq m_{k-1}, 1 \leq 1 \leq m_{k-2}} \left| \cos^{-1}\left( \frac{\overline{z_i^k z_j^{k-1}} \cdot \overline{z_j^{k-1} z_l^{k-2}}}{|z_i^k z_j^{k-1}||z_j^{k-1} z_l^{k-2}|} \right) \right| \qquad \text{Eq. 4}$$

where $z_i^k$ is the ith measurement at the kth scan (scan 500 in FIG. 5) and $m_k$ is the number of measurements at the kth scan. The symbol "." in the numerator of Eq. 4 denotes a vector inner product operation and | | is a determinant of a vector. The score is calculated by $$e_i^k = (\cos(\theta_i^k) + 1)/2 \, \epsilon[01], \, i=1, \ldots, m_k. \qquad \text{Eq. 5}$$

where $\theta_i^k$ is angle 550 or angle 580 in FIG. 5.

It can be clearly seen that the larger score will be assigned to a measurement $z_i^k$ in scan k which fits better into a smoothest sequence terminating at $z_i^k$. For example, a very smooth raw data sequence is shown at 570 in FIG. 5 and a sequence of lesser smoothness is shown at 560; the smooth sequence receives a high score and is the sequence of 560 receives a lower score because it is less smooth and there is a lower probability that it represents an actual target. The presently used scoring for any given sequence may be better appreciated by drawing lines, 530 and 540 each through any two adjacent points within a sequence as described in FIG. 5. The angular displacement 550, between the lines 530 and 540, is then used to determine a score. As seen in Equation 5, the cosine of a small angle 580 will produce a score value close to 1, signifying a smooth sequence and the cosine of large angle 550 will produce a value close to zero, signifying a sequence that is less smooth. If more than three scans are involved and the pattern sequence is a smooth sequence, the score is determined by an average of the scores of every three scans. Other score functions can be formulated as long as it describes a degree of fitness of a given sequence to a pattern sequence. For example, a normalized distance based function could be used as a score function.

For purposes of illustration, the demonstration software accompanying this invention accomplishes both temporal and spatial reduction (described later) in the subroutine coarse.m. The temporal reduction is set to combine measurements from two scans, resulting in half-rate tracker filtering. The sequence of measurements identified by the detection scoring algorithm as having the highest score for each current measurement is used to emulate the associated data generated within the tracker. Once temporal compression is completed, the data is then spatially compressed and then provided to the tracker. The equations implemented in the tracker itself must be modified in order to properly account for the data compression. A feature of the present invention is that the change in the model dynamics due to the compression can be calculated without resorting to simulation.

In the accompanying microfiche software, in the routine coarse.m, a Haar wavelet transform was used to accomplish the temporal reduction or compression. This is also indicated in the flowgraph of coarse.m in FIG. 7, block 5. It is well known that for a given time-frequency mapping function, the product of the time and frequency resolutional cells is constant, which is called the uncertainty principle. The wavelet transform is founded on basis functions formed by dilation and translation of a prototype function. These basis functions are short-duration (for high frequency) and long-duration (for low frequency) functions. The choice of the wavelet prototype function depends on a particular application. Since the data processing (filtering) of our application is carried out in the time domain, the scoring functions with a good time domain localization property, such as Haar functions, are preferred.

The process described in FIG. 5 temporally reduces each sequence of raw data into a single scored value, the specific score representing the smoothness of the sequence. The advantage of employing the described temporal reduction is the obtaining of a single value which avoids inputting, and then computing in the tracker each individual raw data point of each sequence. In addition to gating a single scan of raw data points to eliminate unlikely candidates, as previously described, whole sequences of raw data points are evaluated and, if necessary, eliminated. Known aircraft flight capabilities produce a large, but limited number of possible target sequences. Sequences falling outside these limits are eliminated from further consideration. For example, sequences with kinematic equations signifying a target with a velocity impossible in light of state of the art aircraft capabilities are eliminated. The elimination of improbable raw data points, as well as impossible target sequences, contributes to the goal of reducing tracker computer processing resources.

Figure 6:
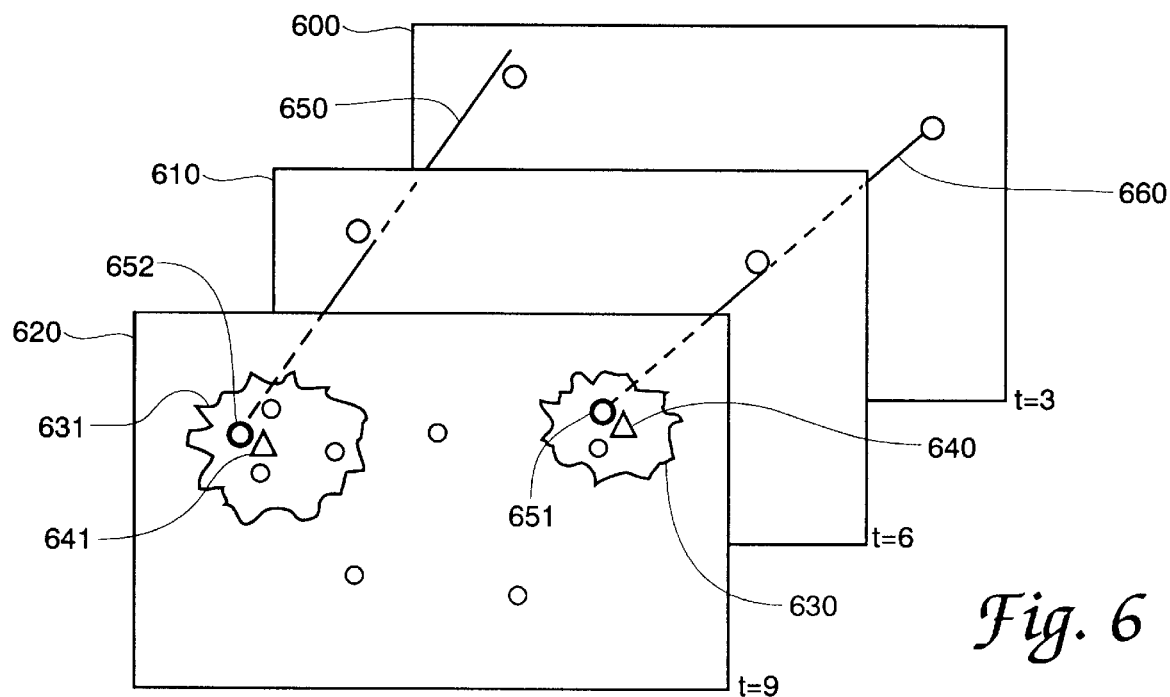
FIG. 6 shows a representation of combining.

The present invention also includes a second scaling or data reduction which spatially reduces the scored values to further reduce the computational load of the tracker. This second reduction is represented by the Spatial Multires block of FIG. 3. FIG. 6 illustrates the second scaling or data reduction process of the present invention for three consecutive scans. Sequences 650 and 660 are generated from three consecutive scans 600, 610 and 620. The scored values from the temporal reduction of the present invention are represented by circles. The triangles 640 and 641 each represent the second data reduction of the present invention, the generation of a single combined value of all the scored values falling within cells 630 and 631, respectively. Each of the single combined values, 640 and 641 are weighted averages of all the scored values obtained according to the relationship:

$$z^k = \frac{1}{e_1^k + e_2^k + \ldots + e_N^k} (e_1^k z_1^k + e_2^k z_2^k + \ldots + e_N^k z_N^k) \quad \text{Eq. 6}$$

where N is the number of measurements falling into cell 630 or 631, $e_i^k$, i=1, ..., N are the corresponding scores and $z^k$ is the weighted average at instant k of the N scores. The weighted average values are accomplished in the accompanying computer software by the routine coarse.m. Because the single combined values 640 and 641 are each weighted averages of all the temporally compressed values within the cells 630 and 631, respectively, the triangle symbols representing these values are located closest to the temporally compressed or scored value within their respective cells having the highest value. The scored value with the highest value is represented by a bold circle at 651 and 652. The significance of the location of the scored value is that the combined measurements are likely to locate either close to potential new tracks or close to the existing tracks, which enhances the track initialization capability and track maintenance accuracy.

The number of scored values combined, or in other words, the number of scored values spatially reduced to produce a single combined coarse resolution value to be input to the tracker is determined by selecting a threshold value determined by the computer processing resources available for tracking as designated by the system operator. For example, if the system operator designates that the computer processing resource availability is low and that computer resources are needed for other system functions, then the selected threshold value will be high and many scored values will be included in the single, combined coarse resolution value. Once a threshold value is selected, distances between all adjacent scored values are determined and all scores whose associated distances fall below the selected threshold value are combined into a single coarse resolution value.

In addition to the above described multiresolution feature of the invention, an added feature is the ability to recover the original raw data measurements from the temporally and spatially reduced values. This added feature is useful when only one target track is considered high priority and the system operator wants to focus on that particular track. A system operator has the ability to obtain the raw data and perform tracking calculations on the raw data for the greatest tracking accuracy possible. Raw data is recoverable from the coarse resolution measurement by using the inverse resolution transform based on the indexing information derived in the first measurement reduction process as shown in Eq. 6. The capability of accuracy refining is very important for maximum use of raw data information when additional computing power is available.

The data reductions of the present invention discussed above, therefore, allow a reduced amount of data to be input into a tracker. The tracker subsequently performs the typical functions of track initialization and maintenance, data association and filtering using modified equations. In addition to reducing the amount of data input into a tracker in order to reduce computer processing resource requirements, the present invention allows the tracker to update tracks at multiple rates. The ability to update a tracker at multiple rates further reduces computational load and power requirements of the tracker because not all tracks are updated at a high, or even medium rate. A track that is smooth, representing a large transport aircraft, for example, with high accuracy is updated at a lower rate. There is no advantage in updating at a high rate and expending the associated computer processing resources if the updated track is very close to the predicted point. On the other hand, when updating maneuvering tracks, the highest updating rate is used in order to determine the path of the target being tracked. Multiple rate updating is accomplished using a bank of Multirate Interacting Multiple Model (MRIMM) filters which is located in the Tracker Block of FIG. 3. Each of n number of models within the filter bank is assigned an update rate by the system operator based on selected kinematic equations associated therewith. For example, a model programmed for kinematic equations descriptive of smooth tracks is assigned a lower update rate, whereas a model programmed for kinematic equations descriptive of less smooth tracks is preferably assigned a higher update rate.

Coarse resolution values are applied to models having the most smoothest assumed kinematics at the assigned update rate. Further, the output of the tracker is a weighted sum of the outputs of the n number of models in such a way that the weight of a model is proportional to the likelihood of the model being a correct model for the target kinematic behavior. This is important because the Interactive Multiple Model, IMM, is considered as one of most effective approaches for tracking maneuvering and nonmaneuvering targets, using MRIMM will maintain the strength of the IMM and save computational resources. In the accompanying program, the spatial and temporal compression are performed in the subroutine coarse.m to illustrate the data compression features of the present invention. The compressed data was then provided to a single model tracker designed to accept half rate data with specific spatial compression.

The multirate multiresolution tracking approach lends itself to cooperative tracking among multiple platforms, such as tracking from two fighter aircraft. Because data is available within the tracker at multiple resolutions and update rates, this information can be exchanged at variable intervals and used to generate global tracks that are of higher quality than for either aircraft track file alone. The frequency of data exchange is determined on a track-by-track basis based on the multirate process outlined above. The tracker is always seeking to update tracks as infrequently as possible. This minimum update rate criteria establishes an indigenous control mechanism to regulate the rate of data exchange between cooperative platforms. Very little information is lost in this process as the coarse measurements exchanged by the aircraft can be deresolved to their original fidelity by the receiving aircraft, if necessary. This approach to cooperative engagement will provide high quality shared tracks with a great deal of robustness in the face of evasive maneuvering and limited transmission bandwidth.

The advantages of the present invention have been demonstrated using computer simulations. The programs are written in Matlab.macros and run on a UNIX operating system. The source code is provided as part of this patent as well as the accompanying flow diagrams of FIGS. 7, 8 and 9. FIG. 7 is a flow diagram of the program titled coarse.m which spatially and temporally reduces the raw data. A distance matrix is initialized for each measurement in each scan. The distance matrix characterizes the inter-relation among all the measurements and serves as mechanism for dynamic cell thresholding. After the distance matrix is initialized, interscan gating is performed as described in FIG. 4.

Following the gating, the program sorts for the smoothest sequence for each current measurement by an optimization process. A score for each sequence is determined and assigned by comparing points within various sequences and obtaining the angular alignment as described in FIG. 5. Finally, temporal compression is performed on the data using a Haar wavelet transform and spatial compression is performed using weighted average to obtain the combined measurement. FIG. 8 is a flowgraph of the program nmhtm which performs the known tracking functions of initialization, data association, track maintenance and elimination.

Figure 9:
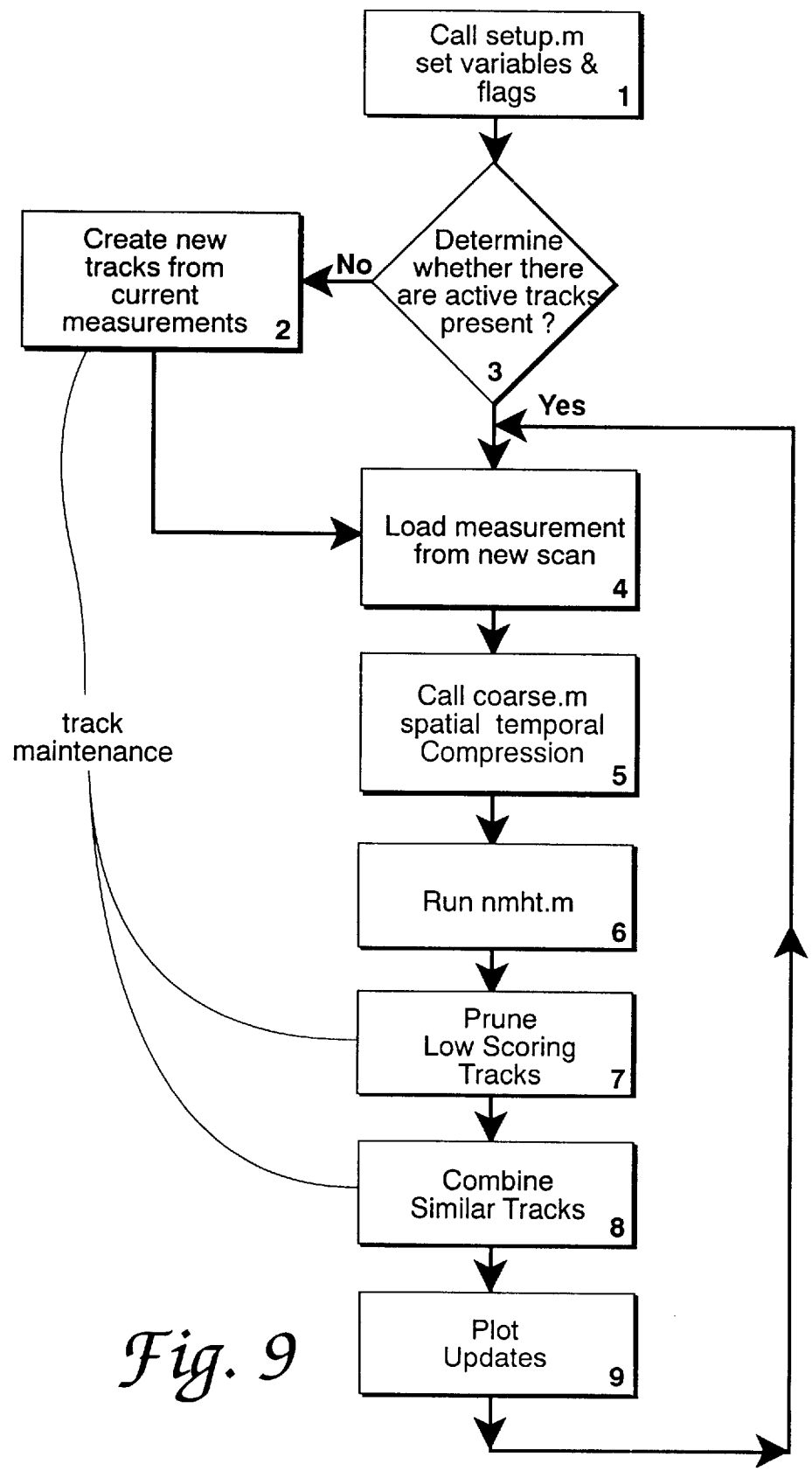
FIG. 9 is a detailed flow chart of a tracking portion of the accompanying computer software.

FIG. 9 is a flow graph of the tcon1.m program which performs the entire known tracking function and calls the coarse.m program to reduce the data and nmht.m to initialize and update tracks, as well as display the confirmed tracks in different colors (red for a high confident track, and blue for a low confident track) to the pilot.

The present invention addresses the issue of limited computer processing resources by providing a full tracking system computer processing load reduction approach using multiresolution and multirate techniques. Further, the present invention is not tracker specific, and could be used to reduce the data, and in turn the computational load, input to any known tracker and thereby enhance performance and allow it to track even more distant targets. The processing overhead allotted to the present invention can be varied in real-time to dynamically allocate system resources based on the relative importance of the tracking function in comparison with other computational needs.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. A data reducing method for detecting and following targets comprising the steps of:

collecting raw data of fine resolution representative of target position, velocity and acceleration characteristics determined from a sequential plurality of target region scans by a group of target data sensors;

evaluating said raw data;

excluding from said raw data data representing targets displaced more than a selected distance from a previous prediction of next target position;

scoring each of n number of sequences of fine resolution raw target data according to predefined kinematics patterns, said scoring reflecting a temporal reduction of raw data points into a single value representing weights of said raw data comprising each of said sequences:

combining a selected number of scores from each of n number of sequences, said combining reflecting a spatial reduction of scored fine resolution values into a single coarse resolution value;

tracking said coarse resolution values: and providing tracking information output signals reflecting said coarse resolution values.

2. A method as set forth in claim 1, where the step of evaluating raw data comprises the steps of:

calculating a normalized distance representing displacement of a raw data measurement from a point predicted as a next measurement divided by an uncertainty factor for each raw data point, said uncertainty factor reflecting a quality measure of a previous track and an uncertainty index for said sensors; and eliminating from further consideration raw data points wherein said distance between each of said raw data points and a point predicted as a next measurement is less than said normalized measurement.

3. A method as set forth in claim 2, wherein said scoring step is preceded by the steps of:

examining each possible sequence of raw target data definable in said sequential target region scans for being unrealistic in view of known aircraft flight capabilities; and eliminating unrealistic target sequences from further consideration.

4. A method as set forth in claim 2, wherein said evaluating step constitutes an equivalent of placing a 2-dimensional ellipsoid over said point predicted as a next measurement and eliminating from further consideration raw data points that fall outside said 2-dimensional ellipsoid.

5. A method as set forth in claim 2, wherein said eliminating step comprises the steps of:

selecting a threshold value defining distances between impossible sequences of raw data points, sequences impossible in view of known aircraft flight capabilities; and eliminating from further consideration all sequences falling above said threshold value.

6. A method as set forth in claim 1, wherein said scoring step comprises the steps of considering data points located within bounds of a scan region defined by an imaginary 3-dimensional conical shaped gate propagated backward onto n previous scans, said conical shaped gate being determined by kinematics characterization of each current measurement;

determining an alignment defined by pairs of adjacent data points within said conical shaped gate and measuring an angular displacement between any two of said alignments; and calculating a mathematical cosine function of said angular displacement to determine a score.

7. A method as set forth in claim 6, wherein scoring step is accomplished using a Haar wavelet transform.

8. A method as set forth in claim 1, further comprising the step of determining resolution of data in said scoring and combining steps based on computer processing resource availability.

9. A method as set forth in claim 1, wherein said combining step further comprises the steps of:
- selecting a threshold value based upon a desired tracking information output signal update rate determined by a system operator;
- measuring a displacement of each scored value from said scoring step for n number of sequences; and
- combining distance values that fall below said threshold value.

10. A method as set forth in claim 1, wherein said collecting step is performed using a measurement based scanning scheme.

11. A method as set forth in claim 1, wherein said coarse resolution point of spatially reduced data from said combining step is located in close proximity to a highest valued scored point from said scoring step.

12. A method as set forth in claim 1, wherein said tracking step comprises the steps of:
- assigning update rates to an Interactive Multiple Model Filter Bank (IMMFB) wherein each number of n models of said IMMFB is assigned a unique update rate and wherein each update rate is based upon predefined kinematic patterns;
- communicating coarse resolution measurements to said n number of models of said IMMFB with kinematic patterns similar to those of said models; and
- updating said IMMFB with coarse resolution measurements, said updating rate being dependent upon smoothness of said coarse resolution measurements associated with each of said models.

13. A data reducing apparatus for detecting and following airborne targets comprising:
- means for collecting raw data representative of target position, velocity and acceleration characteristics determined from a sequential plurality of target region scans by a group of target data sensors:
- means for evaluating said raw data;
- means for excluding from said raw data data representing targets displaced more than a selected distance from a previous prediction of next target position;
- means for scoring each of n number of sequences of fine resolution raw target data according to predefined kinematic patterns, said scoring reflecting a temporal reduction of raw data points into a single point representing weights of raw data points making up each of said sequences;
- means for combining a selected number of scores from each of n number of sequences, said combining reflecting a spatial reduction of scored fine resolution points into a single coarse resolution point, said coarse resolution point of spatially reduced data being located closest to a scored point having a highest value from said scoring step;
- means for tracking coarse resolution measurements; and
- means for providing tracking information output signals.

14. A data reducing apparatus as in claim 13 wherein said means for evaluating said raw data comprises:
- means for calculating a normalized distance representing displacement of a raw data measurement from a point predicted as a next measurement divided by an uncertainty factor for each raw data point, said uncertainty factor reflecting previous track quality and an uncertainty index for said sensors; and
- means for eliminating from further consideration raw data points wherein said distance between each of said raw data points and a point predicted as the next measurement is less than said normalized measurement.

15. A data reducing apparatus as in claim 13 wherein said means for scoring is preceded by:
- means for examining each possible sequence of raw target data definable in said sequential target region scans for being unrealistic in view of known aircraft flight capabilities; and
- means for eliminating unrealistic target sequences from further consideration.

16. A data reducing apparatus as in claim 14, wherein said means for eliminating comprises:
- means for selecting a threshold value defining distances between impossible sequences of raw data points, sequences impossible in view of known aircraft flight capabilities; and
- means for eliminating from further consideration all sequences falling above said threshold value.

17. A data reducing apparatus as in claim 14 wherein said means for scoring comprises:
- means for considering data points located within bounds of a scan region defined by an imaginary 3-dimensional conical shaped gate propagated backward onto n previous scans, said conical shaped gate being determined by kinematics characteristics of each current measurement;
- means for determining an alignment defined by pairs of adjacent data points within said conical shaped gate and measuring an angular displacement between any two of said alignments; and
- means for calculating the cosine of said angular displacement to determine a score.

* * * * *